(12) United States Patent
Levin et al.

(10) Patent No.: US 7,830,855 B2
(45) Date of Patent: Nov. 9, 2010

(54) METHOD AND APPARATUS FOR DATA ALLOCATION IN AN OVERLAP-ENABLED COMMUNICATION SYSTEM

(75) Inventors: Howard E. Levin, Austin, TX (US); Kenneth J. Cavanaugh, Austin, TX (US); Jeffrey P. Gleason, Cedar Park, TX (US); Peter R. Molnar, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1680 days.

(21) Appl. No.: 10/958,039

(22) Filed: Oct. 4, 2004

(65) Prior Publication Data

US 2005/0058115 A1 Mar. 17, 2005

Related U.S. Application Data

(63) Continuation of application No. 09/379,081, filed on Aug. 23, 1999, now abandoned.

(51) Int. Cl.
*H04B 7/208* (2006.01)

(52) U.S. Cl. ........................ 370/344; 370/319

(58) Field of Classification Search ............... 370/319, 370/344
See application file for complete search history.

(56) References Cited

U.S. PATENT DOCUMENTS

| | | | |
|---|---|---|---|
| 4,328,581 A | 5/1982 | Harmon et al. | |
| 4,679,227 A | 7/1987 | Hughes-Hartogs | |
| 4,833,706 A | 5/1989 | Hughes-Hartogs | |
| 5,181,228 A * | 1/1993 | Takatori | 375/350 |
| 5,226,081 A | 7/1993 | Hinokimoto | |
| 5,309,503 A | 5/1994 | Bruckert et al. | |
| 5,400,322 A | 3/1995 | Hunt et al. | |
| 5,475,864 A | 12/1995 | Hamabe | |
| 5,479,447 A | 12/1995 | Chow et al. | |
| 5,548,819 A | 8/1996 | Robb | |
| 5,596,604 A * | 1/1997 | Cioffi et al. | 375/260 |
| 5,598,435 A | 1/1997 | Williams | |
| 5,603,082 A | 2/1997 | Hamabe | |
| 5,774,500 A | 6/1998 | Zogakis et al. | |
| 5,781,728 A | 7/1998 | Rybicki et al. | |
| 5,812,559 A | 9/1998 | Nakaide et al. | |
| 5,822,374 A | 10/1998 | Levin | |
| 5,832,387 A | 11/1998 | Bae et al. | |
| 5,838,268 A | 11/1998 | Frenkel | |
| 5,852,633 A | 12/1998 | Levin et al. | |
| 5,903,608 A | 5/1999 | Chun | |

(Continued)

FOREIGN PATENT DOCUMENTS

EP        0 930 752 A        7/1999

(Continued)

OTHER PUBLICATIONS

Ranjan V. Sonalkar et al., "A Novel Bit and Power Allocation for Duplex Operation of DMT Based DSL Modems"; 1999; pp. 690-694; IEEE.

(Continued)

*Primary Examiner*—Phuc H Tran

(57) ABSTRACT

A communication system is dynamically configured to use some or all of the communication channel bandwidth. Regions of the communication channel are prioritized, and bandwidth is allocated in accordance with priorities and requested data rate.

13 Claims, 7 Drawing Sheets

U.S. PATENT DOCUMENTS

| | | | |
|---|---|---|---|
| 6,031,868 A * | 2/2000 | Robertson et al. | 375/222 |
| 6,038,251 A * | 3/2000 | Chen | 375/222 |
| 6,130,882 A | 10/2000 | Levin | |
| 6,151,335 A | 11/2000 | Ko et al. | |
| 6,226,322 B1 * | 5/2001 | Mukherjee | 375/229 |
| 6,246,716 B1 * | 6/2001 | Schneider | 375/220 |
| 6,275,522 B1 | 8/2001 | Johnson et al. | |
| 6,377,683 B1 | 4/2002 | Dobson et al. | |
| 6,452,907 B1 | 9/2002 | Levin | |
| 6,452,987 B1 | 9/2002 | Larsson et al. | |
| 6,507,606 B2 | 1/2003 | Shenoi et al. | |
| 6,580,761 B2 | 6/2003 | Laroia et al. | |
| 6,628,722 B1 | 9/2003 | Laroia et al. | |
| 6,721,355 B1 | 4/2004 | McClennon et al. | |
| 2001/0012319 A1 * | 8/2001 | Foley | 375/222 |

FOREIGN PATENT DOCUMENTS

| | | |
|---|---|---|
| JP | 05-255945 A | 10/1993 |
| JP | 09-312623 A | 12/1997 |
| WO | 97/11539 A3 | 3/1997 |
| WO | 97/35399 A3 | 9/1997 |
| WO | WO 99/65218 A | 12/1999 |

OTHER PUBLICATIONS

Alliance for Telecommunications Industry Solutions; "Asymmetric Digital Subscriber Line (ADSL) Metallic Interface"; Draft American National Standard for telecommunications, Network and Customer Installation Interfaces, T1E1.4/94-007R7, pp. i-cii and pp. 2-171.

Chow et al.; "A Practical Discrete Multitone Transceiver Loading Algorithm for Data Transmission over Spectrally Shaped Channels"; Feb., Mar., Apr. 1995; IEEE Transactions on Communications: vol. 43, No. 2/3/4; pp. 773-775.

Cioffi; "DMT Information Bus for Multidrop Interface on Existing Wiring"; 1994;T1E1 4/94-126; pp. 1-6.

EP 00117628 EPC Search Report completed Sep. 11, 1001.

EP99100226 EPC Search Report completed Aug. 25, 1999.

Restriction mailed May 12, 2004 in U.S. Appl. No. 09/379,081.

Office Action mailed Jul. 2, 2004 in U.S. Appl. No. 09/379,081.

* cited by examiner

| SNR TABLE | |
|---|---|
| BITS | $SNR_{REF}$ |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

METHOD AND APPARATUS FOR DATA ALLOCATION IN AN OVERLAP-ENABLED COMMUNICATION SYSTEM

This is a continuation of application Ser. No. 09/379,081, filed on Aug. 23, 1999 now abandoned.

CROSS-REFERENCE TO RELATED APPLICATIONS

A related application entitled "Method For Allocating Data And Power In A Discrete Multi-Tone Communication System" by Howard E. Levin et. al, with Ser. No. 09/007,218, now U.S. Pat. No. 6,259,746, was filed on Jan. 14, 1998, and is incorporated by reference herein in its entirety.

FIELD OF THE INVENTION

This invention relates generally to communication systems and more specifically to methods and apparatus for use with overlap-enabled communication systems.

BACKGROUND OF THE INVENTION

In order to make high data rate interactive services such as video conferencing and internet access available to more residential and small business customers, high speed data communication paths are required. Although fiber optic cable is one preferred transmission media for such high data rate services, it is not readily available in existing communications networks, and the expense of installing fiber optic cable is prohibitive. Current telephone wiring connections, which consist of twisted pair media, were not designed to support the high data rates required for interactive services such as video on demand or even high speed interconnects. In response, Asymmetrical Digital Subscriber Line (ADSL) technology has been developed to increase the transmission capabilities within the fixed bandwidth of existing twisted pair connections, allowing interactive services to be provided without requiring the installation of new fiber optic cable.

Discrete Multi-Toned (DMT) is a multi-carrier technique that divides the available bandwidth of a communications channel such as a twisted pair connection into a number of frequency sub-channels. These sub-channels are also referred to as frequency bins or carriers. The DMT technique has been adopted by the ANSI T1E1.4 (ADSL) committee for use in ADSL systems. In ADSL, DMT is used to generate 250 separate 4.3125 kHz sub-channels from 26 kHz to 1.1 MHz for downstream transmission to the end user, and 25 sub-channels from 26 kHz to 138 kHz for upstream transmission by the end user. Each bin is allocated a number of bits to send with each transmission. The number of bits allocated to an ADSL system are 0, and 2-15 bits.

Prior to transmitting real-time data with an ADSL system, an initialization process occurs. During a first portion of the initialization process, an activation and acknowledgment step occurs. It is during this step that a transmit activation tone is generated following power-up of the ADSL system. Transceiver training is the next step of the initialization process. During transceiver training, the equalization filters of the ADSL system are trained and system synchronization is achieved. Next, channel analysis and exchange are performed as part of the initialization processes. During the channel analysis and exchange, the Signal to Noise Ratio (SNR) of the channels is determined, and bit loading configuration of the bins and other configuration information is transferred.

Subsequent to the initialization process, real-time data transmission begins. During real-time data transmission, proposed implementations of the ANSI standard require that each carrier be transmitted with a nominal amount of power. The nominal amount of power is proposed to be a full amount of power that is approximately the same across all bins, as only a fine power gain adjustment variation occurs between carriers. However, there are disadvantages to assigning the nominal amount of transmit power to each carrier. For example, one problem is that there is unnecessary power consumption associated with assigning a nominal amount of power to a carrier that is not transmitting any data. This occurs when the requested data rate is less than the maximum data rate achievable on the line. This additional power results in additional system costs in terms of power consumption. Another issue of transmitting power on unused bins is that as a carrier's signal is attenuated over long line distances, there is a point where data cannot be transmitted with a desired certainty. When this occurs, the bit allocation capacity of the bad bin is set to zero, however, under proposed implementations of the specification, its transmit power remains allocated to the now unused bin. Therefore, there is a high cost in power even when there is not a high data rate. Another issue with the ADSL specification is that crosstalk interference occurs when signals are being transmitted at similar frequencies on adjacent line.

Generally, over one-half of the power consumed by a typical DMT system is consumed by the line drivers. In addition to the thermal issues associated with increased power, there is an additional problem that crosstalk from adjacent phone lines can increase line noise levels as much as 40 dB. Therefore, it would be beneficial to optimize power consumption of a DMT system, and reduce cross-talk between adjacent twisted pair wires.

In addition, many communication systems, such as ADSL systems, have a capability of transmitting data over a frequency overlapped region that may be used by the uplink and downlink. Using the overlapped region in certain applications may improve performance, such as improved capacity and loop length coverage. However, communicating over the overlapped region may have certain side effects, such as cross-talk. Thus, there is a need for an improved method and apparatus for using an overlap-enabled communication system.

SUMMARY OF THE INVENTION

There is herein provided an apparatus having a processing unit. The processing unit determines a channel characteristic of a communication channel. In one form the channel characteristic is a geographic location of circuits connected to the communication channel. A filter is responsive to the processing unit. A line driver is in communication with a communication channel. The filter and the line driver are dynamically configured by the processing unit to communicate over a particular set of frequency regions of the communication channel in response to the channel characteristic determined by the processing unit.

BRIEF DESCRIPTION OF THE DRAWINGS

Certain embodiments of the present invention are described with reference to the following figures.

DETAILED DESCRIPTION OF THE DRAWINGS

Figure 1:
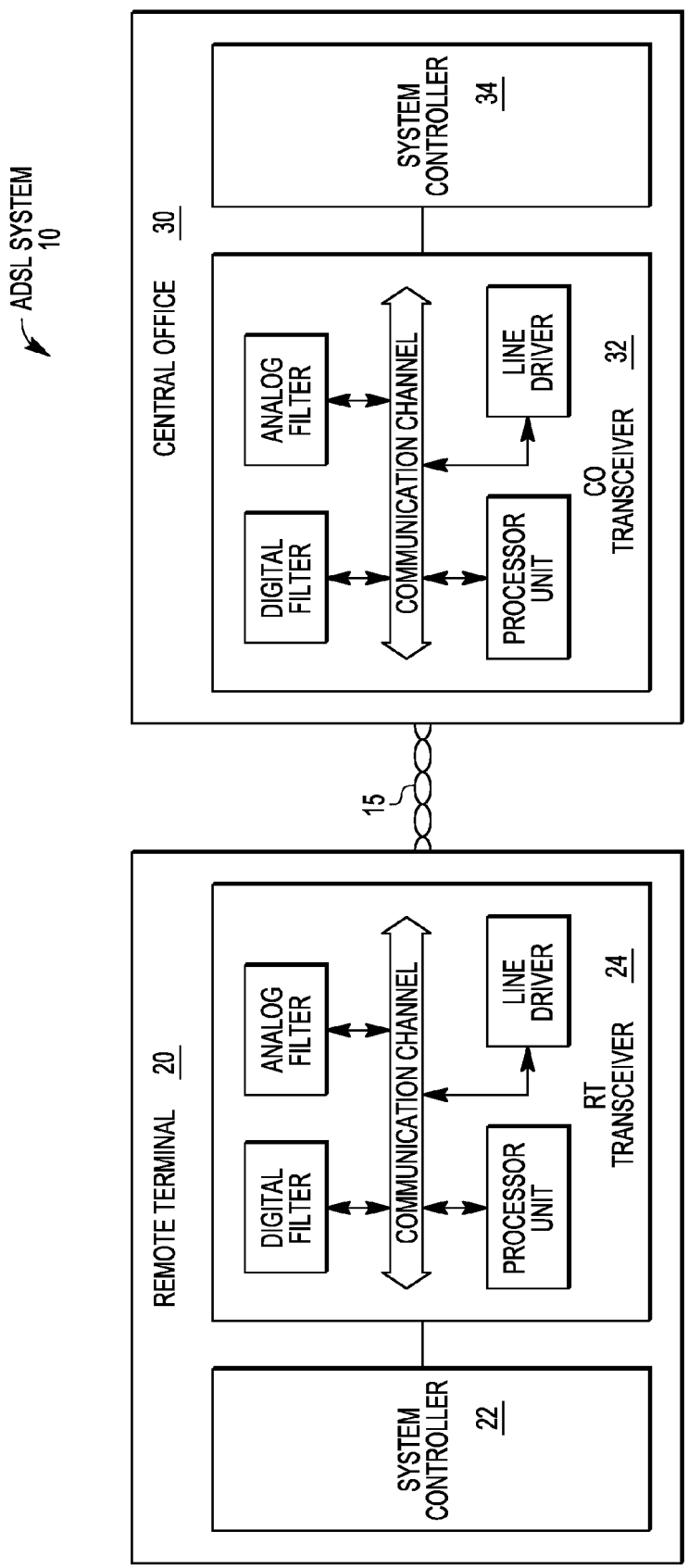
FIG. 1, illustrates an ADSL system in block form.

FIG. 1 illustrates an ADSL system 10. The ADSL system 10 comprises a remote terminal 20, and a central office 30 connected by a twisted pair transmission media. The remote terminal 20 and central office 30 each comprise a system controller 22 and 34, respectively. In addition, the remote terminal 20 and central office 30 respectively comprise a transceiver 24 and 32. The transceiver may include a processor unit, various filters, such as digital filters or analog filters, and a line driver in communication with a communication channel. The filters and line driver may be dynamically configured by the processing unit to allow for communication over various selected frequency regions of the communication channel. The ADSL system 10 is capable of implementing the present invention. In operation, the central office 30 transmits downstream data across the transmission media 15 to the remote terminal 20. The data is received at the remote terminal 20 by the transceiver 24, which provides the received data to the system controller 22 for further processing. In a likewise fashion, the upstream data would be transmitted from the remote terminal 20, across the transmission media 15, and received by the central office transceiver 32, which provides the data to the system controller 34.

Figures 2, 3:
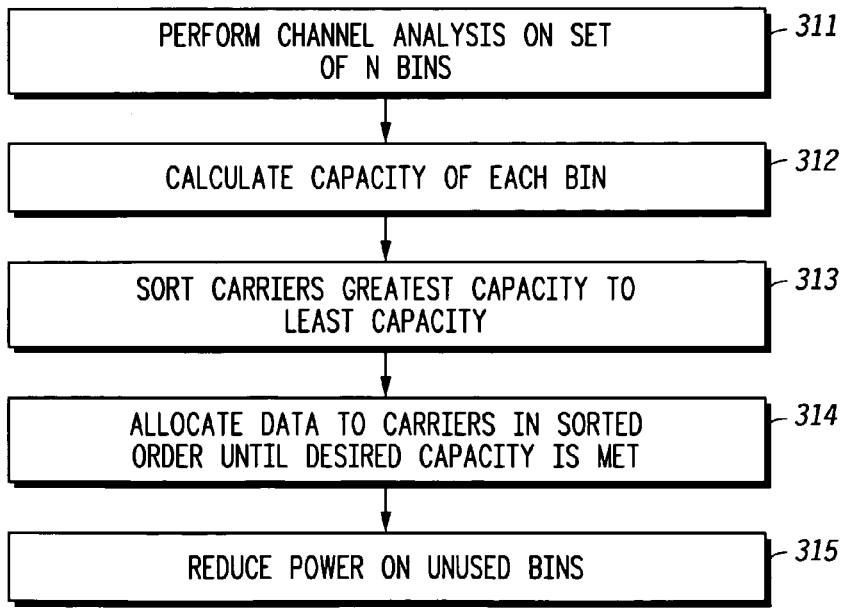
FIG. 2, illustrates an SNR reference table.
FIGS. 3-5, illustrate in flow diagram form, specific methods for reducing the power of a DMT system.

FIG. 2 illustrates an SNR reference table for use within the ADSL system 10. The SNR reference table indicates an SNR-ref value, which is the SNR needed for a bin to transmit a specific number of bits at a specific Bit Error Rate (BER). For example, according to the table of FIG. 2, a bin which is determined to have an SNR of 30 would be able to transmit seven bits of data. Also, the values of SNR reference table will vary depending upon the type of error correction used, if any. For example, the use of error correction could reduce each SNRref value in FIG. 2 by three. This reduction would allow a bin having a SNR of 30 to transmit eight bits. Generally, the SNR reference table will be empirically derived, but can also be derived based upon simulated or theoretical results.

FIG. 3 illustrates a method for implementing the present invention. While the specific embodiment will address a specific DMT implementation, it is to be understood that the present invention applies to any DMT implementation. At step 311, an analysis of an ADSL channel is performed. In one embodiment of the present invention, the channel analysis step 311 would return a signal-to-noise ratio (SNR) for a channel in an initial state. Generally, the channel analysis step 311 of FIG. 3 is performed as part of the initialization process. However, other implementations where the steps of FIG. 3 are performed during real time operation are anticipated by the present invention.

At step 312, the data capacity of each bin is calculated. In one embodiment, the data capacity is calculated based upon the SNR of a carrier, as determined in step 311, and the SNR reference table of FIG. 2. The data capacity can be determined by identifying, for a given SNR reference table, the maximum number of bits that can be transmitted. For example, according to the table of FIG. 2, the maximum number of bits that could be allocated to a bin having an SNR of 32 is seven bits.

Next, at step 313, the carriers or bins are sorted from greatest capacity to least capacity. Next, at step 314, the data rate to be transmitted is allocated beginning with the carrier(s) with the greatest capacity and proceeding to the carrier(s) with the least capacity. The data capacity is allocated until the specified data rate is achieved. By allocating to those bins with the greatest data rate first, it is possible to minimize the number of carriers used (used carriers) to transmit data at the desired data rate. At step 315, the power on the unused carriers is reduced in order to minimize the power used to transmit a specified amount of information. Generally, the power will be reduced by at least an order of magnitude of the power of a used bin. This is advantageous over the prior art which has required each channel to maintain a nominal amount of power whether it is used or unused. By reducing power to unused bins, an optimal amount of power dissipation is possible.

Figure 4:
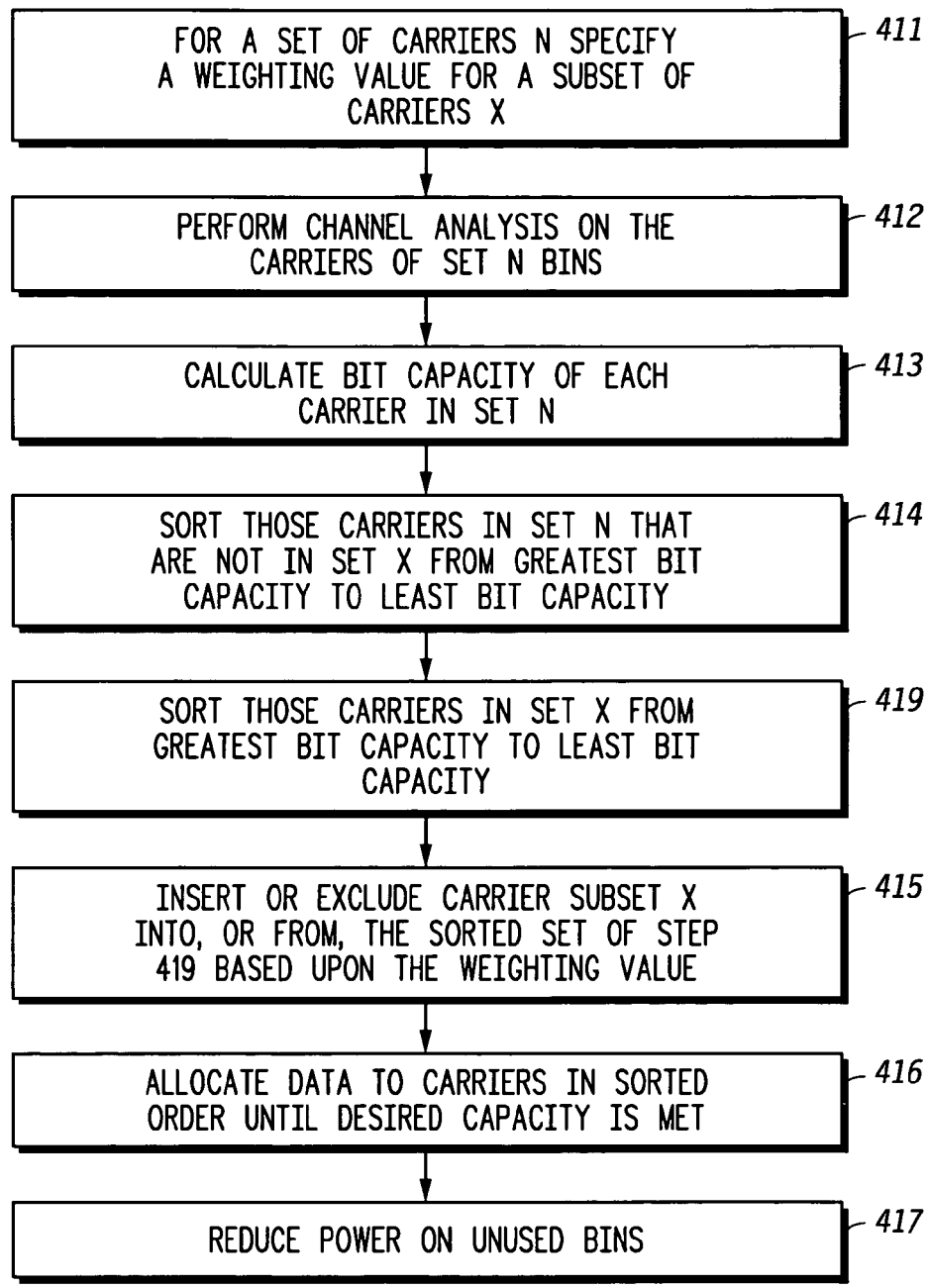

FIG. 4 illustrates a different embodiment of the present invention. At step 411, for a set of carriers N, a subset carrier X is specified. The subset X will generally represent carriers which are to be preferred or avoided during the bit loading allocation process. The subset X is then weighted. The weighting can be explicit, whereby a weighting value is specified by a user, or implicit, whereby the system would have a default weighting for the subset X. For example, the subset X could implicitly be heavily weighted. The function of the weighting will be discussed with reference to step 415.

At step 412, a channel analysis is performed on each carrier of set N. The channel analysis of step 412 is performed in the same manner as the channel analysis of step 311 of FIG. 3, as previously discussed. Next, at step 413, the bit loading capacity for each bin in carrier set N is calculated. This step is analogous to step 312 of FIG. 3.

At step 414, the carriers of set N that are not in set X are sorted from greatest bit loading capacity to least bit loading capacity to form a sorted set of carriers. This step is analogous in function to step 313 of FIG. 3, except that it is performed on a subset of the set.

At step 419, the carriers in set X are also sorted from greatest bit loading capacity to least bit loading capacity to for another sorted set. In an alternative embodiment, the set X need not be sorted.

At step 415, the bins associated with carrier subset X are inserted or excluded from the sorted set of carriers. In one embodiment, where the bins of set X are implicitly heavily weighted, the set would be positioned in the sorted set before, or after, bins meeting some predefined criteria. For example, heavily weighted bins could be positioned before the bins with the greatest capacity. In another embodiment, the heavily weighted bins could be positioned between bins having a capacity of ten bits, and bins having a capacity of nine bits. Generally, a heavily weighted set is inserted with bins having significant bit allocation capacity. In one embodiment, where 15 bits is the maximum loading for a bin, a heavily weighted set would generally be inserted at or above the 7 bit allocation level.

In a similar manner, where the bins of set X are implicitly lightly weighted, they could be excluded from the sorted list entirely, inserted after the bins with the least bit loading capacity, or inserted between bins having a specified loading level. Generally, a lightly weighted set is inserted with bins having low bit allocation capacity. In one embodiment, where 15 bits is the maximum loading for a bin, a heavily weighted set would generally be inserted at or above the 7 bit allocation level.

In an embodiment where a numerical weighting is applied the exact placement of the bins of set X would be placed, or excluded, based upon the value of the weighting.

At step 416, the number of bits needed to support a specified data rate are allocated to the bins based upon the sorted order of the set. For example, assuming the set X is inserted between bins having loading capacity of 13 and 14 bits. The allocation would begin with a bin, not in set X, having 15 bits of loading capacity. Once the first bin was assigned 15 bits, another bin, not in set X, having 15 bits of capacity would be assigned 15 bits, and so on until all 15 bit bins are fully assigned. Next, all 14 bit bins, not in set X would be filled in a similar manner. Next, the bits of set X would be filled prior to the loading of any 13 bit capacity bin which is not in set X. Subsequent to each bin of set X being filled, the filling process would continue with the 13 bit capacity bins.

Figure 5:
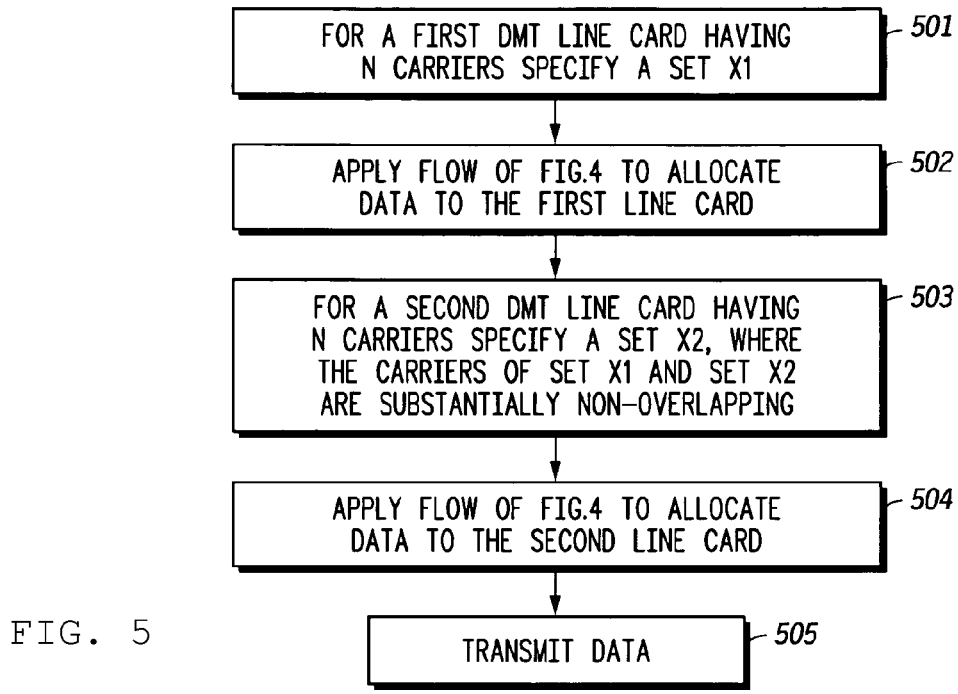

FIG. 5 illustrates another embodiment of the present invention whereby crosstalk between adjacent lines can be reduced. At step 501, a subset of carriers X1 is specified for a first line card. At step 502, the flow of FIG. 4 is applied to the subset X1. This in effect minimized the number of carriers line card 2 needs to drive in order to support a specific data rate.

At step 503, a subset of substantially non-overlapping carriers X2 is specified for a first line card. In one embodiment, the sets X1 and X2 would be mutually exclusive in that they would attempt to allocate the data capacity to bins operating at different frequencies. In yet another embodiment, the sets X1 and X2 would be chosen to buffer used bins in separate line cards from each other. For example, if set X1 specified bins 1-10 as bins to be filled first, set X2 would indicate bins 12-21 as bins to be filled first. To the extent the bit loading capacity could be allocated within the specified bins, there would be an unused bin, bin 11, buffering the frequency range of set X1 and X2. This buffering allows for greater immunity to cross talk.

Once set X2 is defined, the method of FIG. 4 is applied in order to optimize power of the system. At step 505, data transmission occurs, allowing for optimization of power dissipation and limiting crosstalk among adjacent lines.

Figure 6:
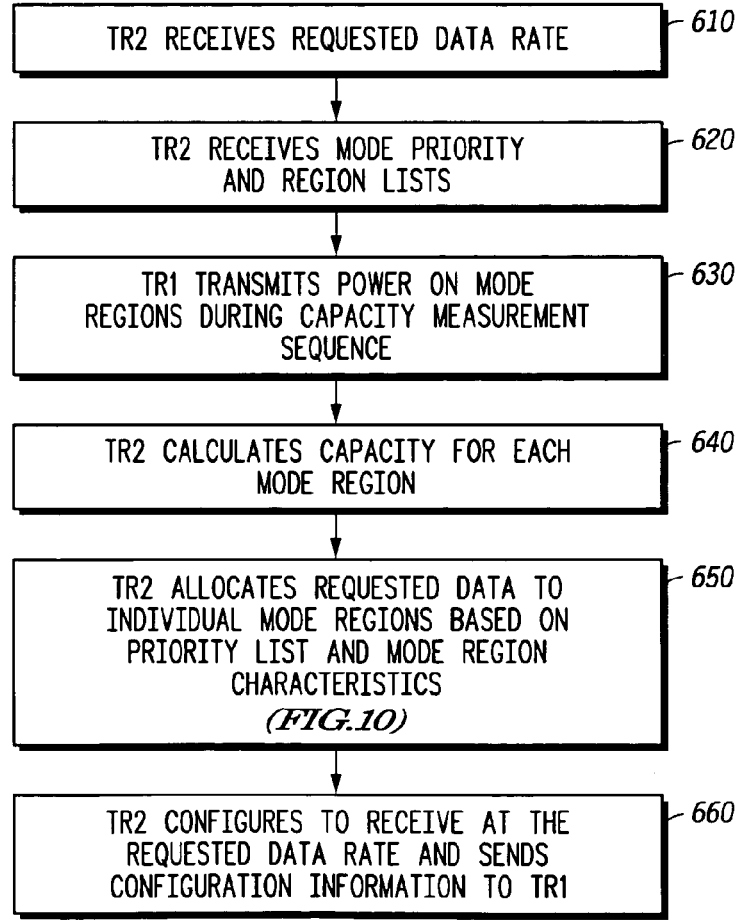
FIG. 6 is a flow chart that illustrates a particular method of allocating data.
Figure 7:
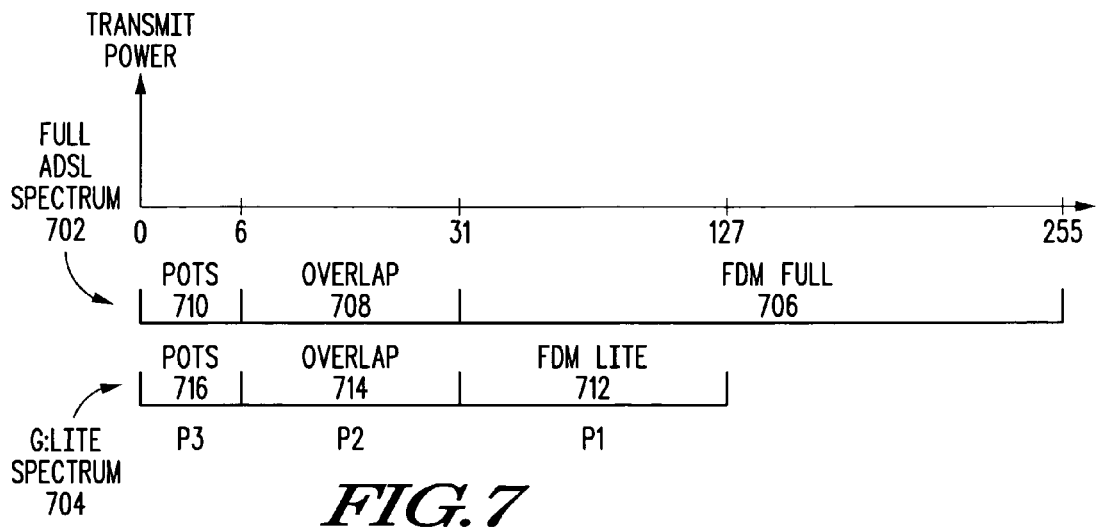
FIG. 7 is a graph that illustrates frequency regions.

FIG. 6 illustrates a method of allocating data in a communication system. At step 610, a remote terminal transceiver (TR2) receives a requested data rate. At step 620, TR2 receives at least one mode priority and region list. The data rate, mode priority, and region lists, for example, may be user inputs received by TR2, may be received by a central office transceiver (TR1) and forwarded to TR2, or may be fixed. The region list may separate the total usable bandwidth of a communication channel into individual frequency sub-bands called regions. Three exemplary regions are a POTS (Plain Old Telephone System) region, an overlap region, and a non-overlap region as shown in FIG. 7. The priority list includes relative priorities of the regions. At step 630, TR1 transmits training sequences over all carriers in multiple regions of the communication channel during a capacity measurement sequence so that TR2 can calculate the capacity for each region during step 640. The multiple regions may include, for example, the overlapped region and the non-overlapped region (e.g., an FDM full or FDM lite region). The POTS region may also be included. At step 650, TR2 allocates requested data to individual mode regions based on the priority list and the mode region characteristics (discussed hereinafter with reference to FIGS. 7, 9 and 10). At step 660, TR2 configures itself to receive at the requested data rate and sends configuration information to TR1 to appropriately configure TR1's transmitter.

Figure 8:
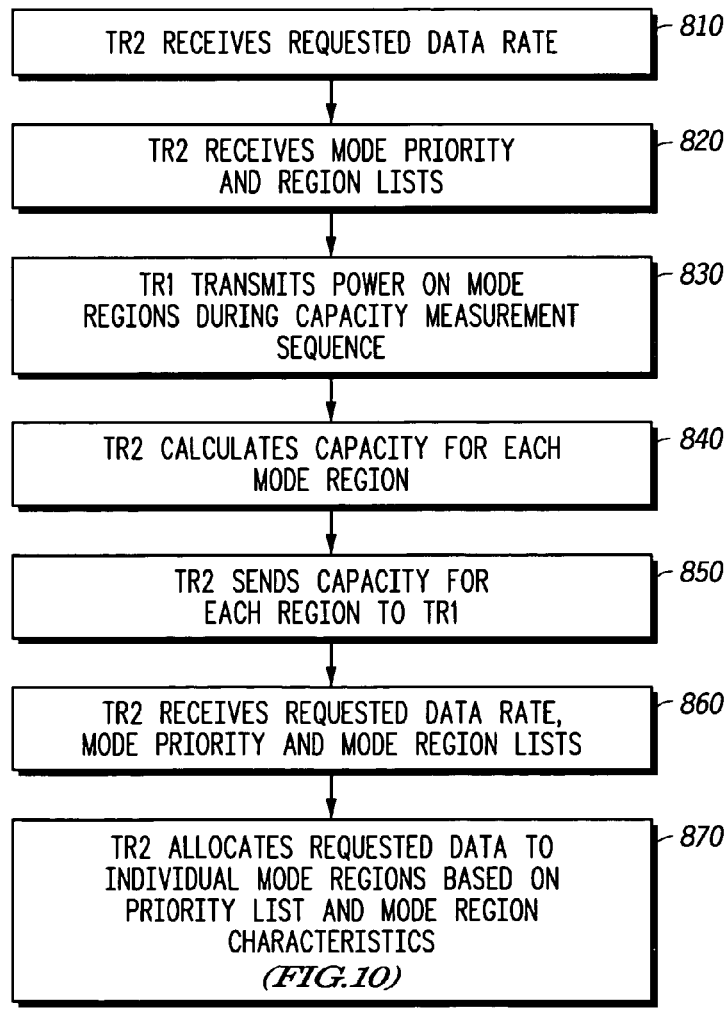
FIG. 8 is a flow chart that illustrates a particular method of allocating data.

FIG. 8 illustrates a method of allocating data in a communication system. At step 810, a remote terminal transceiver (TR2) receives a requested data rate. At step 820, TR2 receives mode priority and region lists. The data rate, mode priority, and region lists, for example, may be user inputs received by TR2, or may be received by a central office transceiver (TR1) and forwarded to TR2, or may be fixed. At step 830, TR1 transmits training sequences in multiple regions during a capacity measurement sequence so that TR2 can calculate the capacity for each region during step 840. At step 850, TR2 sends the maximum capacity information for each region to TR1. At step 860, TR2 receives a new requested data rate and a new priority list. At step 870, TR2 allocates requested data to individual mode regions based on the priority list and the mode region characteristics (discussed hereinafter with reference to FIGS. 7, 9 and 10). Steps 810 and 820 are optional. If steps 810 and 820 are used, TR1 may wait until step 860 to send the first requested data rate, priority list and region list after TR2 sends the capacity for each region to TR1.

Figure 9:
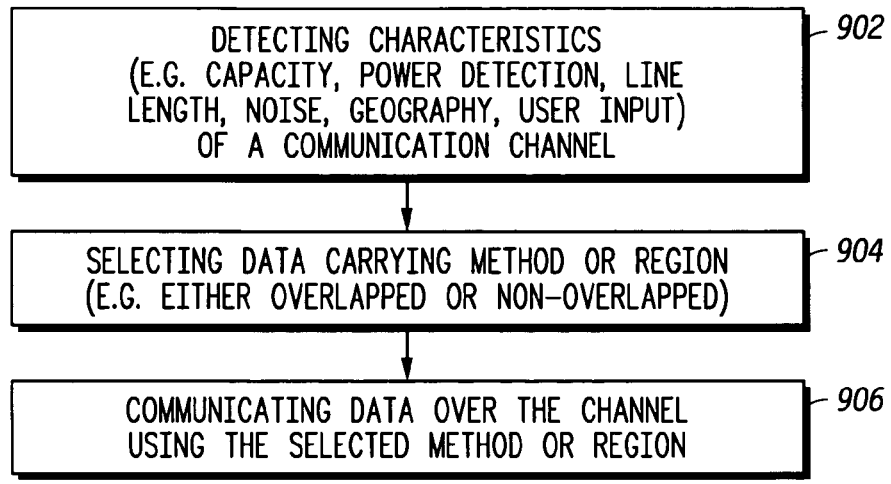
FIG. 9 is a flow chart that illustrates a general method of data allocation in an overlap-enabled communication system.

Referring to FIG. 9, a particular method of allocating data is illustrated. In this method, characteristics of a communication channel are detected, at 902. Exemplary characteristics include capacity, power detection of a channel, channel length, noise, geography (i.e. a geographic location of circuits connected to the communication channel) and user input. Next, at 904, a data carrying method or region is selected. The method or region may be either an overlapped or non-overlapped method or region. Once the particular method or region has been selected, data is communicated over the channel using the selected method, at 906. By allowing different methods or regions for carrying data, and making decisions based on channel characteristics, communication data to be transmitted may be allocated to particular channels in a flexible and configurable manner. In addition, since the step of selecting a particular data carrying method or region is performed dynamically, limited communication resources such as particular frequency bins within an ADSL system, may be used efficiently.

Referring to FIG. 7, a general diagram that illustrates transmit power versus frequency for an overlap-enabled communication system is shown. The communication channel is subdivided into separate modes or frequency regions, including a POTS region 710, an overlapped region 708, and a frequency division multiplexed (FDM) full rate region 706. These frequency regions form the full spectrum for a full rate ADSL spectrum 702. For a G.lite spectrum 704 implementation, there is a POTS region 716, an overlap region 714, and an FDM lite region 712. The frequency regions have been prioritized in a particular illustrative embodiment in the order P1, P2 and P3 as shown. For example, for full ADSL, FDM 706 is first priority for allocation, overlapped region 708 has second priority, and finally where no other capacity is available, POTS region 710 may be used and has third priority.

By dynamically selecting and configuring various frequency modes, data may be more efficiently allocated and communicated over an ADSL system. In addition, the priority scheme for allocating data for different regions is useful for customizing training sequences based on user input, channel characteristics or other desired parameters.

Figure 10:
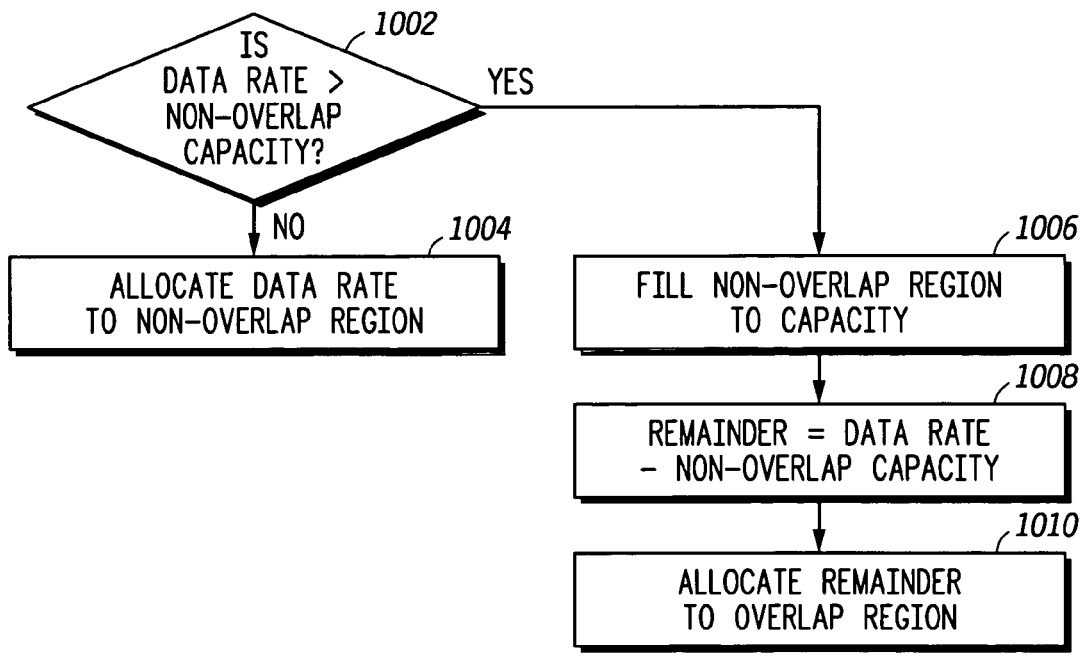
FIG. 10 is a flow chart that illustrates a particular exemplary method of allocating data to different frequency regions.

Referring to FIG. 10, an illustrative method of allocating data is shown. At decision step 1002, a desired transmission data rate is compared to the available non-overlapped capacity. If the data rate exceeds the non-overlapped capacity, then processing continues to step 1006 where the non-overlapped region is filled to its capacity. Next, in this scenario, the remaining desired capacity which is equal to the desired data rate less the non-overlapped capacity is determined, at 1008. The remainder is then allocated to an overlapped region of the frequency spectrum, at step 1010. However, where the data rate is not less than the non-overlapped capacity, then the data rate is allocated only within the non-overlapped region, at step 1004. With this illustrative method, data capacity is allocated as a first priority to non-overlapped regions (e.g., the FDM full or FDM lite regions) before being allocated to overlapped regions (e.g., an upstream region). In this manner, potential side effects from overlapped regions, such as cross talk or lack of echo canceling equipment, is reduced.

Figure 11:
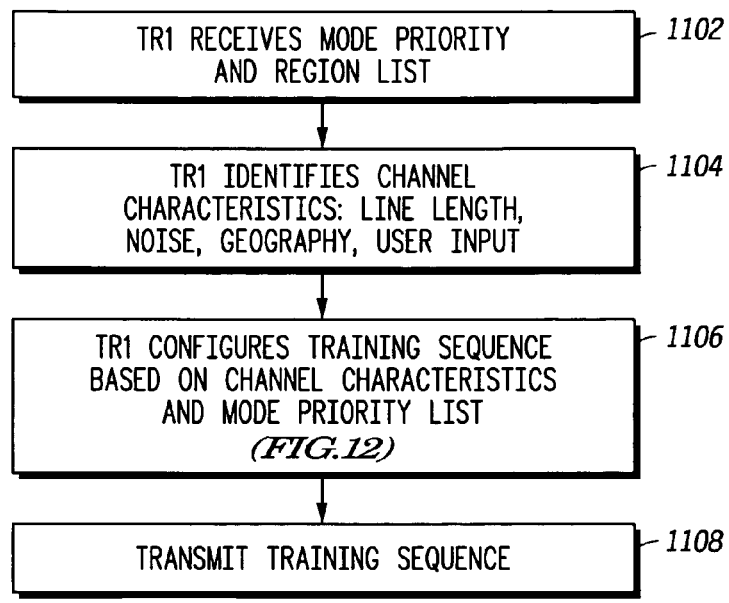
FIG. 11 is a flow chart that illustrates a particular method of allocating data for use by a sending transceiver.
Figure 12:
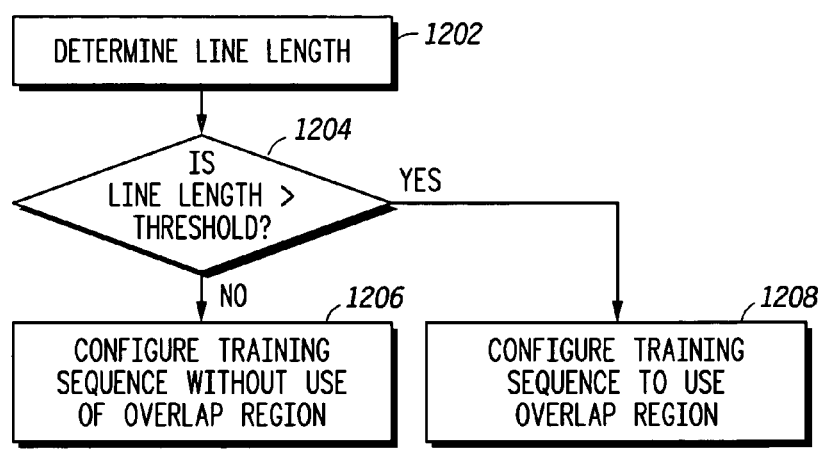
FIG. 12 is a flow chart that illustrates a communication system data allocation method based on line length.

Referring to FIG. 11, a particular method of allocating data to a communication channel of a multi-carrier communication system is illustrated. A first transmitter TR1 receives mode priority and region list, at step 1102. The priority and region list may either be fixed, may be determined from another transceiver via a message, or may be determined by a user and in this case would be user selectable. An example of a mode priority and region list would include a non-overlapped region, an analog POTS region and an overlapped region. An example priority scheme may have the non-overlapped region having priority over the overlapped region, and both non-overlapped and overlapped having priority of using the analog POTS region. Next, TR1 identifies channel characteristics, such as the channels line length, noise, geography or other user input, at 1104. The particular channel characteristics may either be measured, predetermined or received from another transceiver or user. The first transmitter TR1 then configures a training sequence for the channel based on the channel characteristics and based on the mode priority list, at 1106. A more specific method for performing the training sequence is illustrated in FIG. 12. Finally, the training sequence is transmitted by TR1 over the channel, at 1108. A benefit of the illustrated method of allocating data in the manner shown in FIG. 11, is the flexibility in adapting to priorities and channel characteristics. For example, by varying the training sequence due to geography, a system which is sold into two different markets, such as the United States and Europe, may conform with two different industry requirements by making a selection of training sequence as a function of geography. Alternatively, where training sequence is based on line length, different methods of training and transmitting data may be used as a function of the particular length of line between the carrier equipment and the end user.

Referring to FIG. 12, a particular method of using channel length, such as line length, to effect configuration of a training sequence is shown. Initially, a channel length for a communication channel is determined at 1202. One method of determining the line length is to measure received power from a far end transceiver and compare the received power level with a predetermined power to line-length table. Additionally, noise can be factored out by averaging received data. The line length may also be received from an external source. The line length is compared to a threshold, at decision step 1204. The threshold may be either user input, predetermined or otherwise empirically determined. If the line length exceeds the threshold, then the training sequence is configured using overlapped regions of the frequency spectrum. However, where the line length does not exceed the threshold, then the training sequence is configured without use of the overlapped region, at 1206. With this method, the line length is used as a decision variable to determine when overlapped regions need to be used when configuring training sequences for subsequent data allocation and communication.

Figure 13:
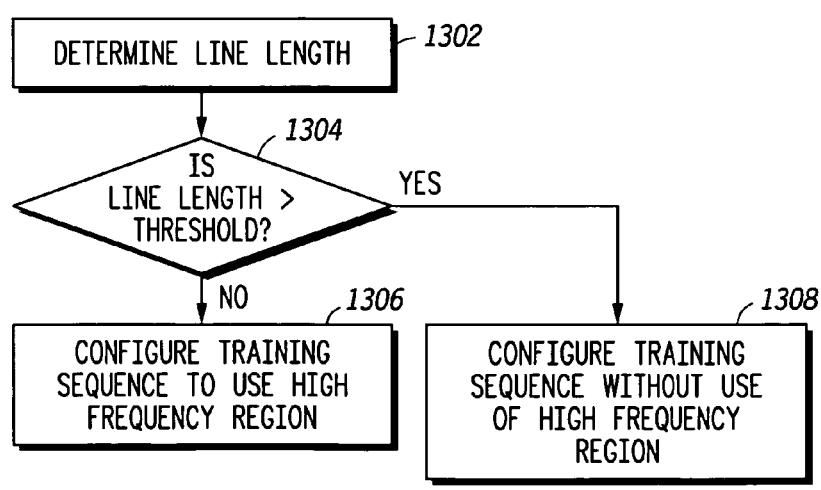
FIG. 13 is a flow chart that illustrates a second communication system data allocation method based on line length.

Referring to FIG. 13, an alternative method of allocating data as a function of line length is shown. The line length is determined, at 1302. The line length is compared to a threshold, at 1304. Where the line length exceeds the threshold, the training sequence is configured without use of a high frequency region, at 1308. Where the line length does not exceed the threshold, the training sequence is configured to use the high frequency region, at 1306. For communication channels with a long line length, it has been determined that the high frequency regions are not as helpful in gaining additional capacity, and by configuring a training sequence without using such high frequency regions, the overall up link and down link system may be improved.

The foregoing specification has identified a preferred method for improving performance of an ADSL system. The invention has been described with reference to specific embodiments. However, one of ordinary skill in the art will appreciate that various modifications and changes can be made to the present invention without departing from the scope of the present invention as set forth in the claims below. For example, the specific embodiment has been discussed in terms of using the SNRref table of FIG. 2 to determine the loading of a bin. One skilled in the art would appreciate that other methods of determining bin loading are capable of being used. As another example, while the disclosure refers to ADSL, the methods, embodiments, and systems illustrated herein may be applicable to other multi-carrier systems, including many other types of digital subscriber line systems. Accordingly, the present invention is to be construed in accordance with the broadest permissible interpretation of the claims set forth below and their equivalents, rather than any of the specific illustrative embodiments described above.

What is claimed is:

1. In a communication system, a remote terminal comprising:
   a transceiver for communicating with a communication channel; and
   a system controller coupled to the transceiver for controlling the transceiver, the transceiver using geographic location of circuits connected to the communication channel to configure data transmission along the communication channel in one of a first mode wherein upstream data transmission and downstream data transmission are sent in substantially non-overlapping frequency domains, and a second mode wherein upstream data transmission and downstream data transmission are sent in substantially overlapping frequency domains, the communication channel communicating data via a plurality of frequency bins wherein the bins are segmented into a plurality of groups, the groups being selectively prioritized so that bins associated with the first mode are utilized before the bins associated with the second mode.

2. In the communication system of claim 1 wherein the first mode is a frequency division multiplexed mode (FDM) that uses at least one filter and the second mode is an echo cancellation mode that uses echo cancellation processing.

3. In the communication system of claim 1, the transceiver also using a data capacity of the communication channel to configure data transmission along the communication channel in one of the first mode or the second mode.

4. In the communication system of claim 1, the transceiver also using a noise level of the communication channel to configure data transmission along the communication channel in one of the first mode or the second mode.

5. The communication system of claim 1 wherein the communication channel communicates discrete multi-tone (DMT) data.

6. The communication system of claim 1 wherein the communication channel is processed occasionally during transmission to determine if the first and second modes should be changed between one another over time.

7. The communication system of claim 1 wherein prioritization of the groups is determined by one of: (1) a fixed prioritization; (2) another transceiver via a message; or (3) a user of the communication system.

8. The communication system of claim 1 wherein higher-frequency non-overlapped bins are used first, followed by overlapped frequency bins that accommodate both upstream and downstream data, followed by frequency bins that accommodate plain old telephone service (POTS) information.

9. The communication system of claim 1, wherein the transceiver configures the communication channel in the first mode for transmission in a frequency division multiplex manner, detects changing line conditions of the communication channel, reconfigures the communication channel in the second mode for transmission in an echo cancellation manner, and continues to communicate data for the transmission in the echo cancellation manner.

10. The communication system of claim 9 wherein the changing line conditions progress to a point where the transceiver reconfigures the communication channel to use POTS frequency spectrum to communicate data for the transmission.

11. An apparatus comprising:
a processing unit, the processing unit determining a channel characteristic of a communication channel for communicating data via a plurality of frequency bins wherein the frequency bins are segmented into a plurality of groups, the groups being prioritized between predetermined frequency regions so that frequency bins associated with a first frequency region are used before frequency bins associated with a second frequency region, the channel characteristic being a geographic location of circuits connected to the communication channel;
a filter responsive to the processing unit; and
a line driver in communication with the communication channel;
wherein the filter and the line driver are dynamically configured by the processing unit to communicate over a particular set of frequency regions of the communication channel in response to the channel characteristic determined by the processing unit.

12. The apparatus of claim 11, wherein the characteristic is also a channel length and the processor configures the filter and line driver to communicate in a non-overlapped region of the channel and where the filter and line driver are dynamically configured in response to input from an external source, the external source including user input and a far end transceiver message.

13. The apparatus of claim 11, wherein the characteristic is also a channel length and the processor configures the filter and line driver to communicate in an overlapped region or a plain old telephone service region of the channel.

* * * * *